United States Patent Office 3,504,080
Patented Mar. 31, 1970

3,504,080
METHOD OF PRODUCING DIMENSION-ALLY - STABLE INJECTION MOLDED POLYESTERS
Erhard Siggel, Laudenbach (Main), Germany, Hilmar Roedel, Therwil, Switzerland, and Walter Rein, Obernburg (Main), Germany, assignors to Glanzstoff AG, Wuppertal, Germany
No Drawing. Original application July 19, 1963, Ser. No. 296,380, now Patent No. 3,361,848, dated Jan. 2, 1968. Divided and this application Oct. 12, 1967, Ser. No. 674,713
Claims priority, application Germany, July 27, 1962, V 22,843
Int. Cl. B29f 1/00; B29c 25/00
U.S. Cl. 264—235
9 Claims

ABSTRACT OF THE DISCLOSURE

Method of producing injection molded polyesters of aromatic dicarboxylic acids and saturated diols, especially polyethylene terephthalate, which have improved properties of dimensional stability at elevated temperatures, by intimately mixing with the polyester up to 10% by weight of a high molecular weight polyolefin of 3 to 6 carbon atom monoolefins, injection molding the resulting mixture into a molded article, and then heat-setting the molded article at a temperature of at least about the second order transition point of the polyester. Polypropylene and poly-4-methylpentene-1 are preferred polyolefin modifiers. The resulting heat-set molded articles are useful under conditions where dimensions must be maintained at elevated temperatures.

---

This application is a division of copending application Ser. No. 296,380, now U.S. Patent No. 3,361,848, filed July 19, 1963.

It is known that injection molded articles can be produced from polyesters of aromatic dicarboxylic acids and diols such as the polyester of terephthalic acid and ethylene glycol. However, in spite of the excellent mechanical properties, resistance to chemical attack and ease of shaping these polyesters, they have been used only to a very minor extent as injection molded articles. The primary reason for this lack of interest in such polyesters for injection molding has been their stability at elevated temperatures, i.e., their poor resistance to heat and their inability to retain their original shapes or dimensions when subjected to heat. Thus, at normal temperatures and even at moderately elevated temperatures below their second order transition point, the injection molded polyester articles retain their original form for a relatively long period of time. Once the molded articles are heated to temperatures within or above this second order transition point, however, then they rapidly and unevenly shrink so as to cause substantial changes in their original shapes or dimensions. The shape of the articles is often distorted and quite different from the original forms. Injection molded polyesters which cannot sustain these higher temperatures have very little practical value in commercial applications.

One object of this invention is to provide a method of producing improved injection molded and heat-set polyesters with substantially better thermal and dimensional stability while retaining the other desirable properties associated with the well known class of fiber-forming linear polycondensates such as polyethylene terephthalate. Similarly, a further object of the invention is to extend the useful applications of these polyesters, normally used only as fibers or films, into the area of articles produced according to the invention by injection molding with subsequent heat-setting, these articles retaining their shape at temperatures within or above the second order transition range. These and other objects and advantages of the invention will become more apparent from the following detailed description.

In accordance with the invention, it has now been found that a dimensionally-stable, heat-resistant, injection molded article can be obtained from polyesters of aromatic dicarboxylic acids and saturated diols if there is homogeneously mixed therewith and finely distributed therein up to 10% by weight of a high molecular weight polyolefin of 3 to 6 carbon atom monoolefins, the mixture is injection molded into an article of predetermined configuration, and the molded article is then heat-set at a temperature of at least about the second order transition point of the polyester. The polyolefin may be added to the polyester before, during or after its polycondensation from the usual monomeric reactants. After injection molding the polyolefin-containing polyester into a three-dimensional article of predetermined shape or configuration, the molded article must be heat-set at a temperature of at least about the second order transition point of the polyester, i.e., at temperatures preferably higher than 80° C. Very little change in the dimensions of the article occurs during such heat-setting, and thereafter the dimensions remain constant even if the article is heated up to temperatures falling within or above the second order transition point.

The polyesters to be modified and treated in accordance with the present invention are obtained by known methods from aromatic dicarboxylic acids, preferably the lower alkyl esters thereof such as the dimethyl ester of terephthalic acid. The aromatic dicarboxylic acid or its ester is esterified or transesterified and polycondensed with a saturated diol such as ethylene glycol, the resulting polycondensate having a molecular weight of at least about 20,000, corresponding to a solution viscosity of at least about 1.60, which is measured as a one percent solution in m-cresol. The saturated diols are saturated aliphatic, cycloaliphatic or aromatic diols, preferably the lower alkane-diols such as ethylene glycol. Polyethylene terephthalate is the preferred polyester because of its excellent properties other than dimensional stability, its availability in large volume and its relatively lower commercial cost. Other polyesters which normally have fiber-forming properties are described, for example in "Polyesters and Their Applications," by Bjorkstn et al., Reinhold Publishing Corp. (1956), pages 199–207. Mixtures of aliphatic carboxylic acids and saturated diols may also be used, but it is again preferable to employ a polyester consisting essentially of polyethylene terephthalate, i.e., wherein not more than ten molar percent, preferably less than five molar percent, of the monomeric components are derived from sources other than terephthalic acid and ethylene glycol.

These known polyesters have a second order transition point of about 64 to 80° C. This second order transition point is sometimes referred to as the glass transition point, and this point is not necessarily a specific temperature but may occur within a certain temperature range just as the melting point for polymers is often defined as a softening range. Accordingly, the terms "transition temperature," "transition point" and "transition range" are employed interchangeably throughout the specification.

The polyolefin employed as the modifying agent should have a molecular weight of at least about 100,000, and those polyolefins are especially suitable which have a second order transition point which is distinct from the second order transition point of the polyester. In general, this second order transition point of the polyolefin should correspond to a temperature of from about −70° C. to +20° C. In addition, the most effective results are achieved when employing a polyolefin having a high isotatic content of at least about 70 percent, and preferably about 85 to 100 percent. The isotatic content or isotatic index is defined as that percentage of the resin which is insoluble in boiling n-heptane.

A significant improvement in the dimensional stability of the polyester is thus achieved when using about 1 to 10 percent by weight, preferably 2 to 5 percent by weight, of a polyolefin which is a polymer of 3 to 6 carbon atom monoolefins, e.g., polypropylene, polyisopropylene, polybutene, polypentene and poly-4-methylpentene. Especially good results have been achieved with polypropylene and poly-4-methylpentene, even when used in relatively small amounts.

The polyolefin may be added to the monomeric dicarboxylic acid or diol reactants prior to the production of the polyester, for example, by admixing the polyolefin in finely divided form with the dimethyl ester of terephthalic acid and subsequently transesterifying and polycondensing with ethylene glycol. It is also possible, however, to add the polyolefin to a granulated polyester product. In either case, an intense mixing or agitation of the polyolefin and polyester are required in order to achieve a substantially homogeneous product with uniform improved properties. At some point during this intense mixing, sufficient heat and/or pressure should be applied in order to melt the polyester and permit the polyolefin to be finely dispersed therein. In the production of the modified polyester, it is advisable in all cases to exclude the presence of oxygen and water. Otherwise, no special precautions are necessary.

Where the polyolefin is admixed with the finished polyester in granulated form, especially good results in terms of homogenization can be achieved if the polyolefin and polyester mixture is first melted in an extrusion apparatus, intensely mixed and extruded with cooling of the extruded product, and finely solidified and granulated. This operation can be carried out with conventional screw extruders, and the entire operation can be referred to as a regranulation.

Whether the polyolefin is added to the polyester before, during or after production of the polyester, intense mixing and homogenization is desirable because the final injection-molded articles have greater dimensional stability as the polyolefin is better distributed in the polyester. The homogenization of the polymer mixture can be greatly facilitated by using a very finely divided polyolefin material as the initial additive, preferably with a particle size of about 1 to 10 microns. These finely divided particles of the polyolefin can be obtained by mechanical pulverizing, and it is also possible to obtain the polyolefin in such finely divided form by conventional processes for the polymerization of the monoolefin.

Once the polyolefin has been finely distributed in the polyester, the substantially homogeneous mixture can be readily molded into three-dimensional articles with any suitable injection-molding apparatus. The injection molding is preferably carried out at temperatures of about 260 to 280° C., but in general no special measures are necessary. It is often advantageous to employ a heated nozzle in order to more easily handle the highly viscous polymer mixture.

After production of the injection molded article, the molded article is preferably first cooled and removed from the mold and then subjected to a heat treatment at an elevated temperature which lies within or above the second order transition range of the polyester. During this heat treatment or heat-setting process, the molded article shrinks only to a very slight degree and generally retains the initial form imparted by injection molding. After this slight shrinkage has taken place, no further shrinkage occurs during subsequent heating even though the temperature is raised above the second order transition range. The duration of this heat-setting treatment will vary depending upon the particular temperature employed, a shorter period of time being required at higher temperatures. Of course, the heat-setting temperature should be substantially below the melting point of the polymer mixture, and in most cases, it is sufficient to employ a temperature somewhat above the second order transition range for a period of about 1 to 2 hours.

The injection molded polyester articles modified with a polyolefin and treated in accordance with the present invention are considerably more valuable than the unmodified polyesters in applications requiring resistance to heat at temperatures which are apt to fall above the second order transition point of the polyester. Furthermore, the modified polyesters of the invention tend to retain their shape as injection molded articles for a longer period of time in those applications where the article is exposed to friction or abrasive forces. The other usual physical, mechanical and chemical properties of the modified polyester are substantially unchanged so that in this respect the polyesters retain a wide range of useful applications.

The following examples will serve to further illustrate the invention, but it should be understood that the invention is not restricted to these specific examples. Parts and percentages are by weight unless otherwise indicated.

EXAMPLE 1

5 kg. of polyethylene terephthalate cuttings (solution viscosity=1.78, measured as 1% solution in m-cresol), having a water content of less than 0.01%, are intensely mixed for one hour with each of the polyolefins in the amounts given in the following Table I under exclusion of air in a screw extruder at 280° to 300° C. The extruded homogeneous mixture of polymers is then cooled, solidified and regranulated. The resulting granulate is dried in conventional manner to a water content below 0.01% and injected by an injection-molding machine into molded articles having the form of cups at 280° to 300° C.

The molded articles are heated for two hours at 140° C. in air, and the dimensions of the heat-set or tempered articles are then compared with those of an untempered molded article. As a further comparison, Table I sets forth the dimensions of an injection molded cup produced from unmodified polyethylene terephthalate in the same manner and also exposed to the heat-setting temperature of 140° C. for the same period of time. As is apparent from Table I, the injection molded articles of polyesters modified according to the invention show only a slight shrinkage and there is no substantial change in form or configuration. Original dimensions of the cup as produced by injection molding:

Height=70 mm.; upper diameter=60 mm.;
Lower diameter=40 mm.; wall thickness=1.7 mm.

TABLE I

| Polyolefin modifier | Tempering °C. | Shrinkage | | Remarks |
|---|---|---|---|---|
| | | Length | Upper diameter | |
| None | None | 0 | 0 | |
| Do | 140 | 12–16 | 5 | Cup has become shapeless. |
| 3.5% poly-4-methylpentene | 140 | 3.4 | 3.2 | Cup is stable in form. |
| 4% poly-4-methylpentene | 140 | 2.7 | 2.9 | Do. |
| 5% poly-4-methylpentene | 140 | 2.0 | 2.4 | Do. |
| 3.5% polypropylene | 140 | 4.1 | 4.1 | Do. |
| 4.7% polypropylene | 140 | 3.8 | 1.8 | Do. |

EXAMPLE 2

From the modified polyester granulate producing according to Example 1, shoulder bars were formed on an injection molding machine at 280 to 300° C. with the following dimensions: length=165 mm.; maximum width=40 mm.; minimum width=25 mm.; and thickness=4 mm. These shoulder bars were exposed together with shoulder bars injection molded from unmodified polyethylene terephthalate to a temperature of 140° C. for two hours.

The results of this treatment, summarized in the following table, clearly show the superiority of the modified polyester according to the invention.

TABLE II

| Polyolefin modifier | Tempering ° C. | Remarks |
|---|---|---|
| None | 140 | Shoulder bar lost its original form and became wavy and distorted. |
| 2% poly-4-methylpentene | 140 | Shoulder bar remained stable in form. |
| 4% poly-4-methylpentene | 140 | Do. |
| 4% polypropylenne | 140 | Do. |

EXAMPLE 3

In two separate preparations, 1500 g. of dimethyl terephthalate were melted in the presence of 0.015% zinc acetate and 0.02% $Sb_2O_3$ and with 60 g. poly-4-methylpentene and 75 g. polypropylene, respectively.

Under strong agitation, while raising the temperature from 160° and 200° C. within two hours, an ester interchange with ethylene glycol was carried out, 490 g. of methanol being split off. Then, while raising the temperature to 220° C. under further vigorous agitation, a total of 630 g. of glycol were distilled off.

The polyolefin was finely distributed during the ester interchange by the agitation of the melt. The strong agitation was continued during a further temperature rise to 280° C. under vacuum until the melt became viscous by progressive condensation. Only then was the agitation reduced by lowering the rate of rotation of the mixer. Then, after 1½ hours with further splitting off of ethylene glycol, condensation was terminated at a solution viscosity of 1.72 (measured as 1% solution in m-cresol at 25° C.). The resulting modified polymer was extruded in conventional manner and cut into granules.

After drying the granules, the polymer was processed as described under Example 1 in an injecting molding machine to form cups having the following dimensions: height=70 mm.; upper diameter=60 mm.; lower diameter=40 mm.; and wall thickness=1.7 mm.

The considerable reduction of shrinkage capacity and the retention of a stable form of the injection molded modified polyester after heat-setting at 140° C. for two hours is shown in the following Table III.

TABLE III

| Polyolefin modifier | Tempering ° C. | Shrinkage Length | Shrinkage Upper diameter | Remarks |
|---|---|---|---|---|
| None | None | 0 | 0 | |
| Do | 140 | 12-16 | 5-7 | Cup (beaker) became shapeless. |
| 4% poly-4-methylpentene | 140 | 2.1 | 2.2 | Cup is stable in form. |
| 5% polypropylene | 140 | 2.7 | 2.0 | Do. |

The polymers employed in the preceding examples are further characterized by the following data:

| Polymer | Molecular weight | Softening point (deg.) | Second order transition point (° C.) |
|---|---|---|---|
| Polyethylene terephthalate | 20,000-30,000 | 262 | 70 |
| Polypropylene | 200,000 | [1] 156 | +3 |
| Poly-4-methylpentene | 200,000 | [1] 225 | +10 |

[1] Melting point.

The invention is hereby claimed as follows:

1. A method of producing a dimensionally-stable injection molded polyester of an aromatic dicarboxylic acid and a saturated diol, said method comprising: incorporating into and homogeneously mixing with said polyester up to 10% by weight of at least one finely divided high molecular weight polyolefin of a 3 to 6 carbon atom monoolefin; injection molding the resulting polyolefin-containing polyester into an article of predetermined configuration; and heat-setting the molded article at a temperature of at least about the second order transition point of the polyester.

2. A method as claimed in claim 1 wherein the polyester is polyethylene terephthalate.

3. A method as claimed in claim 1 wherein said polyolefin has a second order transition point distinct from that of said polyester.

4. A method as claimed in claim 3 wherein said polyolefin is a polymer selected from the group consisting of polypropylene and poly-4-methylpentene.

5. A method as claimed in claim 4 wherein said polyolefin has a high isotactic content of at least about 70%.

6. A method as claimed in claim 1 wherein said polyolefin is incorporated into and homogeneously mixed with said polyester by adding said polyolefin to at least one of the monomeric components of said polyester.

7. A method as claimed in claim 1 wherein said polyolefin is added to said polyester and homogeneously mixed therewith by regranulation.

8. A method as claimed in claim 2 wherein said polyethylene terephthalate has a molecular weight of at least 20,000, and the polyolefin has a molecular weight of at least 100,000 with a second order transition point of from −70° C. to +20° C.

9. A method as claimed in claim 4 wherein the content of said polyolefin is about 2 to 5% by weight with reference to said polyester.

References Cited

UNITED STATES PATENTS

| 3,152,380 | 10/1964 | Martin | 28—72 |
| 3,256,367 | 6/1966 | Jayne | 260—889 |
| 3,257,489 | 6/1966 | Heffelfinger | 264—235 |
| 3,322,854 | 5/1967 | Yasui et al. | 260—873 |

FOREIGN PATENTS 1,282,373  12/1961  France.

MURRAY TILLMAN, Primary Examiner

J. T. GOOLKASIAN, Assistant Examiner

U.S. Cl. X.R.

260—873; 264—328